(12) United States Patent
     Chiu

(10) Patent No.: US 12,153,307 B2
(45) Date of Patent: **\*Nov. 26, 2024**

(54) LIGHT EMITTING DEVICE

(71) Applicant: Innolux Corporation, Miao-Li County (TW)

(72) Inventor: Yujun Chiu, Tainan (TW)

(73) Assignee: Innolux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,758

(22) Filed: Oct. 5, 2023

(65) Prior Publication Data
    US 2024/0045264 A1    Feb. 8, 2024

Related U.S. Application Data

(63) Continuation of application No. 17/859,842, filed on Jul. 7, 2022, now Pat. No. 11,809,041, which is a continuation of application No. 17/195,928, filed on Mar. 9, 2021, now Pat. No. 11,415,833.

(51) Int. Cl.
    *G02F 1/13357*    (2006.01)
(52) U.S. Cl.
    CPC .. *G02F 1/133603* (2013.01); *G02F 1/133606* (2013.01)

(58) Field of Classification Search
    CPC ......... G02F 1/133603; G02F 1/133606; G02B 5/0215; G02B 3/0056
    See application file for complete search history.

(56) References Cited

U.S. PATENT DOCUMENTS

| | | | |
|---|---|---|---|
| 2008/0137193 A1* | 6/2008 | Hsu | G02B 5/0231 359/559 |
| 2008/0137196 A1* | 6/2008 | Hsu | G02B 3/0056 359/599 |
| 2020/0103708 A1* | 4/2020 | Lee | G02F 1/133308 |

\* cited by examiner

*Primary Examiner* — Elmito Breval
(74) *Attorney, Agent, or Firm* — Patterson + Sheridan, LLP

(57) ABSTRACT

A light emitting device is provided. The light emitting device includes a plurality of light emitting units, a film, and a supporting portion. The plurality of light emitting units emit light. The film, which the light passes through, is disposed on the plurality of light emitting units. The film includes a plurality of protrusions. The supporting portion supports the film, and the supporting portion is higher than the plurality of light emitting units. In the top view of the light emitting device, the supporting portion and the plurality of protrusions of the film are overlapped.

11 Claims, 10 Drawing Sheets

LIGHT EMITTING DEVICE

CROSS REFERENCE TO RELATED APPLICATIONS

This application is a Continuation of pending U.S. patent application Ser. No. 17/859,842, filed Jul. 7, 2022 and entitled "DISPLAY DEVICE", which is a Continuation of pending U.S. patent application Ser. No. 17/195,928, filed Mar. 9, 2021 and entitled "BACKLIGHT MODULE AND DISPLAY DEVICE", the entirety of which are incorporated by reference herein.

BACKGROUND

Field of the Disclosure

The present disclosure relates to a backlight module and a display device, and in particular to a backlight module and a display device including a diffuser having a plurality of protrusions.

Description of the Related Art

Backlight modules are commonly used in various electronic devices (such as display devices). In existing backlight modules, the emitted light may not distribute as desired, and the size of the backlight modules still needs to be improved. Therefore, how to solve the above problems has become an important issue.

BRIEF SUMMARY

Some embodiments of the disclosure provide a light emitting device, including a plurality of light emitting units, a film, and a supporting portion. The plurality of light emitting units emit light. The film, which the light passes through, is disposed on the plurality of light emitting units. The film includes a plurality of protrusions. The supporting portion supports the film, and the supporting portion is higher than the plurality of light emitting units. In the top view of the light emitting device, the supporting portion and the plurality of protrusions of the film are overlapped.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
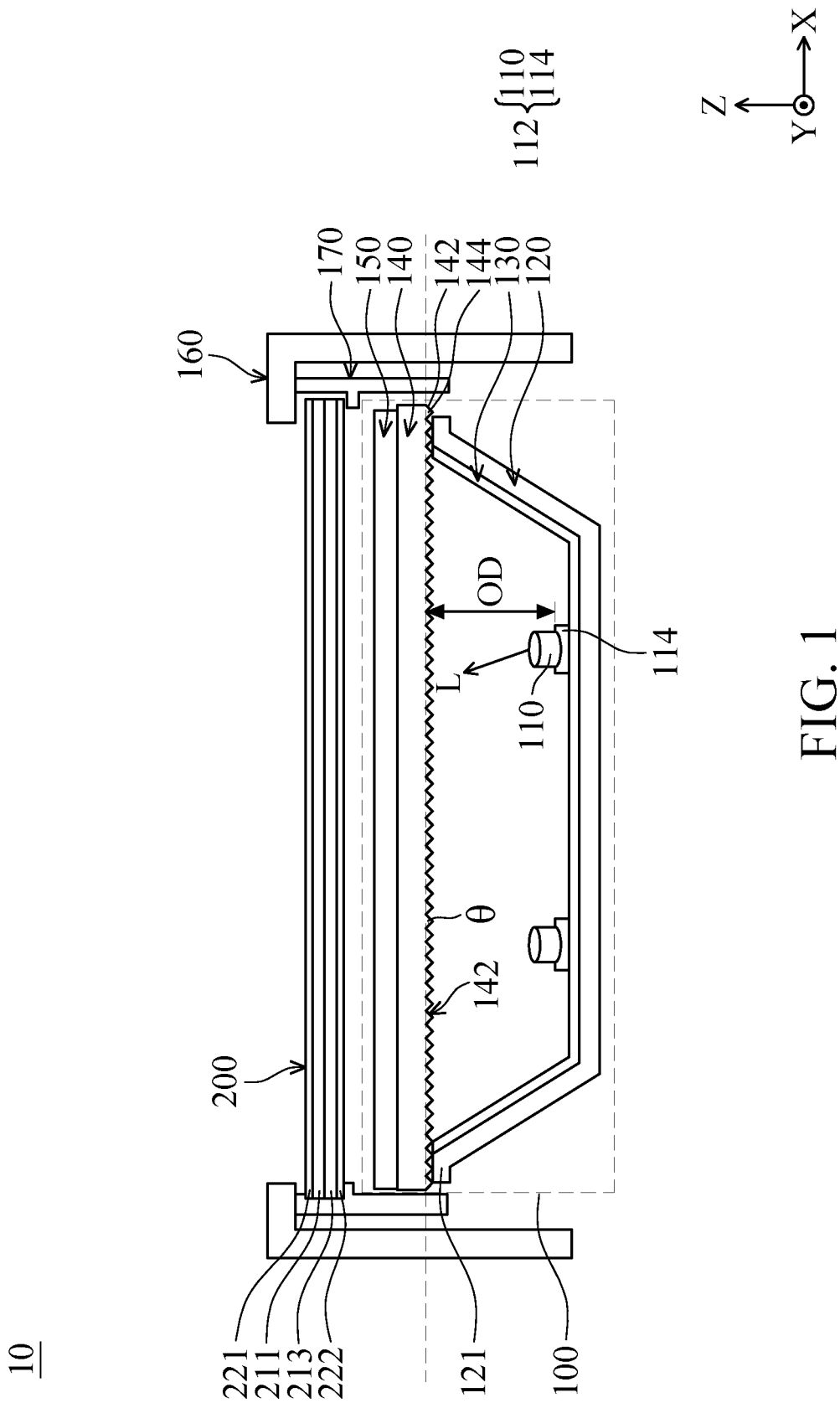
FIG. 1 is a cross-sectional view illustrating a display device in accordance with some embodiments of the present disclosure.

The present disclosure may be understood referring to the following description and the appended drawings. It is noted that for the sake of the comprehensibility and the simplicity of the drawings for the readers, only a portion of the light-emitting unit is illustrated in multiple figures in the present disclosure, and the specific component in the figures are not drawn to scale. In addition, the number and size of each component in the drawings merely serve as an example, but are not intended to limit the scope of the present disclosure. Furthermore, similar and/or corresponding numerals may be used in different embodiments for describing some embodiments simply and clearly, but not represent any relationship between different embodiment and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . ." Therefore, when terms "including", "comprising", and/or "having" are used in the description of the disclosure, the presence of corresponding features, regions, steps, operations and/or components is specified without excluding the presence of one or more other features, regions, steps, operations and/or components.

It will be understood that when an element or layer is referred to as being "contact" or "connected to" another element or layer, it can directly contact or directly connected to the other element or layer, or intervening elements or layers may be presented. In contrast, when an element is referred to as being "directly contact/connect" or "directly contact/connect" another element or layer, there are no intervening elements or layers presented.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (such as a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

The terms "about" or "substantially" are generally interpreted as within 20% of a given value or range, or as interpreted as within 10%, 5%, 3%, 2%, 1%, or 0.5% of a given value or range.

It should be understood that, although the terms "first", "second" etc. may be used herein to describe various elements, regions, layers and/or portions, and these elements, regions, layers, and/or portions should not be limited by these terms. These terms are only used to distinguish one element, component, region, layer, or portion. Thus, a first element, component, region, layer or portion discussed below could be termed a second element, component, region, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first direction is perpendicular to the second direction, the angle between the first direction and the second direction may be between 85 degrees and 95 degrees. If the first direction is parallel to the second direction, the angle between the first direction and the second direction may be between 0 degrees and 5 degrees.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

FIG. 1 is a cross-sectional view illustrating a display device 10 in accordance with some embodiments of the present disclosure. It should be understood that only some elements of the display device 10 (some elements of the backlight module 100) are illustrated in FIG. 1 for clarity. In accordance with some embodiments, additional features or elements may be optionally added to the display device 10. The display device 10 may be a bendable or flexible display device. The display device 10 may be a tiled display device, but it is not limited thereto. The display device 10 may include, for example, light-emitting diode (LED), fluorescence, phosphor, other suitable display medium or combinations thereof, but not limited thereto. For instance, the LED may include inorganic LED, organic LED (OLED), mini LED, micro LED or quantum dot LED (QLED or QDLED), other suitable material or any combination thereof, but the present disclosure is not limited thereto. It should be noted that the display device may be any combination thereof, but it is not limited thereto. As shown in FIG. 1, the display device 10 may include a backlight module 100 and a display panel 200 may be disposed on the backlight module 100. For example, the backlight module 100 may be a direct-lit backlight module, but the present disclosure is not limited thereto. In the present embodiment, the backlight module 100 may include a light bar 112 (including a plurality of light emitting units 110), a backplate 120, a reflection plate 130, a diffuser 140, and at least one optical film 150. The light bar 112 may include a plurality of light emitting units 110 and a circuit board 114 and may be disposed on the backplate 120. The plurality of light emitting units 110 may be disposed on the circuit board 114 and the circuit board 114 may electrically connect the plurality of light emitting units 110. The light emitting units 110 may be configured to emit light (such as the light L), and at least a portion of the emitted light may reflect off the reflection plate 130 and travel toward the diffuser 140. The reflection plate 130 may be disposed on the backplate 120. In some embodiments, the reflection plate 130 may be disposed between the backplate 120 and the light emitting units 110. In other embodiments, the reflection plate 130 may be disposed on the backplate 120 and may include a plurality of openings exposing the light emitting units 110. However, the present disclosure is not limited thereto.

In addition, the diffuser 140 may be disposed on the backplate 120 and a portion of the diffuser 140 may contact the backplate 120. To be more specific, the backplate 120 may include a contacting portion 121 that may extend higher than the light emitting units 110, and the diffuser 140 may contact and may be supported by the contacting portion 121. In some embodiments, the reflection plate 130 may not be disposed on the contacting portion 121, but the present disclosure is not limited thereto. An optical distance OD may be defined as the shortest distance between the diffuser 140 and the circuit board 114 of the light bar 112 in the Z direction perpendicular to the top surface of circuit board 114. In some embodiments, the optical distance OD may range from 5 mm to 40 mm (5 mm≤the optical distance OD≤40 mm), such as 10 mm, 15 mm, 20 mm, 25 mm, 30 mm or 35 mm, but the present disclosure is not limited thereto. In some embodiments, since the contacting portion 121 may contact the diffuser 140, the optical distance OD may be a height difference between the circuit board 114 of the light bar 112 and the top surface of the contacting portion 121 in the Z direction perpendicular to the top surface of the circuit board 114. In some embodiments, the diffuser 140 may have a thickness ranging from 0.8 mm to 1.5 mm, wherein the thickness of the diffuser 140 may be measured in the Z direction perpendicular to the top surface of the circuit board 114, for example, the present disclosure is not limited thereto. With the above configuration, miniaturization of the backlight module 100 may be achieved, and therefore the manufacturing cost may be reduced.

In some embodiments, when the optical distance OD ranges from about 28 mm to 35 mm, the diffuser 140 may have a transmittance ranging from about 55% to 58% such as 56% or 57%, but the present disclosure is not limited thereto. In some embodiments, when the optical distance OD is about 20 mm, the transmittance of the diffuser 140 may be about 32%. For example, the transmittance of the diffuser 140 may be measured by NDH-7000 haze meter, but it is not limited thereto. In other words, if the optical distance OD were greater, the transmittance of the diffuser 140 would be higher. The above design may reduce mura (such as hotspot issue), or the brightness of the display device may be enhanced.

In some embodiments, the diffuser 140 may have a bottom surface 142 that faces the light emitting units 110, and the bottom surface 142 may have a plurality of protrusions 144. In some embodiments, at least one of the protrusions 144 may have a convex angle θ ranging from about 90° to 155°, such as 100°, 120°, 130°, 140° or 150°, but the present disclosure is not limited thereto. With the above configuration, the distribution of the emitted light may be more uniform, and therefore the possibility that mura (such as hotspot issue) occurs in the display device may be reduced. In other ways, the emitted light may be softer with the above configuration. The at least one optical film 150 may be disposed on the diffuser 140 for optimizing the emitted light L. It should be noted that although the single-layered optical film 150 is shown, those skilled in the art may also adopt multiple optical films as required. In some embodiments, the at least one optical film 150 may optionally include a bright enhancement film, a color conversion film, and/or a light recycle film, and the number and arrangement of the above layers may depend on the needs. In some embodiments, the color conversion film may include phosphor, quantum dot, dye, any other suitable material or a combination thereof, but it is not limited thereto. In some embodiments, the light recycle film may be a multi-layered film that includes films with different refractive indexes, wherein these films may be alternatively stacked. As such, the utilization efficiency of the light emitted by the light emitting units 110 may be enhanced.

In the present embodiment, the display panel 200 may be disposed on the backlight module 100. The display panel 200 may include a first substrate 211, a second substrate 213 and liquid crystal layer (not illustrated). The first substrate 211 may be opposite to the second substrate 213 and the liquid crystal layer (not illustrated) may be disposed between the first substrate 211 and the second substrate 213. In addition, the display panel 200 may further include a first polarizer 221 and a second polarizer 222. The first polarizer 221 may be disposed on the first substrate 211 and on the side that may be away from the liquid crystal layer. The second polarizer 222 may be disposed on the second substrate 213 and on the side that may be away from the liquid crystal layer, but it is not limited thereto.

In some embodiments, the first substrate 211 and/or the second substrate 213 may be flexible substrates or non-flexible substrates, but not limited thereto. The materials of the first substrate 211 and the second substrate 213 may include glass, sapphire, ceramics, plastics, or other suitable materials. The plastic material may be, for example, polyimine (PI), polyethylene terephthalate (PET), polycarbonate (PC), polyether oxime (PES), polybutylene terephthalate (PBT), polynaphthalene ethylene glycolate (PEN), polyarylate (PAR), other suitable materials, or a combination thereof, but it is not limited thereto. In some embodiments, a liquid crystal layer may be disposed between the first substrate 211 and the second substrate 213. In some embodiments, the liquid crystal layer may include nematic liquid crystal, smectic liquid crystal, cholesteric liquid crystal, blue phase liquid crystal, or any other suitable liquid crystal material. Furthermore, the display device 10 may further include a frame 160 and a housing 170. A portion of the housing 170 may be disposed between the backlight module 100 and the display panel 200 and configured to position the backlight module 100 and the display panel 200. In some embodiments, when viewed in the Z direction perpendicular to the top surface of circuit board 114, the housing 170 may partially overlap with the display panel 200 and the backlight module 100, but the present disclosure is not limited thereto. The frame 160 may be disposed outside the backlight module 100 and/or the display panel 200 and configured to protect the backlight module 100 and the display panel 200. In some embodiments, the frame 160 may be optionally disposed to protect the elements in the backlight module 100. In the present embodiment, the outer frame may be disposed on the frame 160, the housing 170, and the backplate 120. The outer frame may extend outside the backplate 120. For example, the material of the outer frame may include metal, plastic, any other suitable material, or a combination thereof, but it is not limited thereto.

Figure 2:
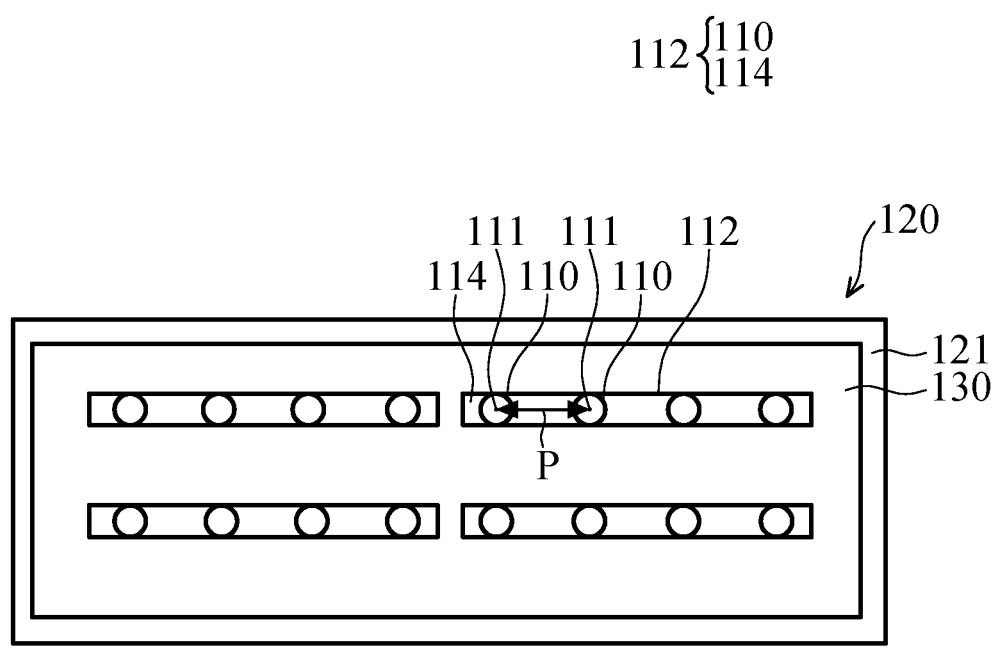
FIG. 2 is a top view illustrating the interior of a backlight module in accordance with some embodiments of the present disclosure.
Figure 2:
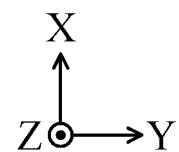

FIG. 2 is a top view illustrating the interior of the backlight module 100 in accordance with some embodiments of the present disclosure. It is noted that the diffuser 140 and the optical film 150 may be not shown in order to clearly illustrate the interior of the backlight module 100. As shown in FIG. 2, a plurality of light bars 112 may be disposed on the backplate 120 and may include a plurality of light emitting units 110 and a circuit board 114, and a plurality of light emitting units 110 may be disposed on each of the circuit board 114. For example, the light bars 112 may be affixed to the backplate 120 via an adhesive (not shown), and electrically connected to an external power source via a connecting wire. In some embodiments, the light bars 112 may be separated from the reflection plate 130. It should be understood that the arrangement of the light bars 112 may be merely an example, which is not intended to limit the scope of the present disclosure.

In addition, a pitch P may be defined as a distance between centers 111 of two adjacent light emitting units 110. In some embodiments, the pitch P may range from about 5 mm to 300 mm (5 mm≤the pitch P≤300 mm), such as 10 mm, 50 mm, 100 mm or 200 mm.

For example, the pitch P may be measured in the Y direction parallel to the lengthwise direction of the light bar 112. In some embodiments, a ratio of the optical distance OD to the pitch P of the adjacent two of the light emitting units 100 may range about from 0.1 to 0.7 (0.1≤the ratio (OD/P)≤0.7), such as 0.3 or 0.5. However, the present disclosure is not limited thereto. Accordingly, the above configuration may widen the distribution of the emitted light, or the distribution of the emitted light may become uniform, thereby reducing the possibility that hotspot issue may occur in the display device, for example.

Figure 3:
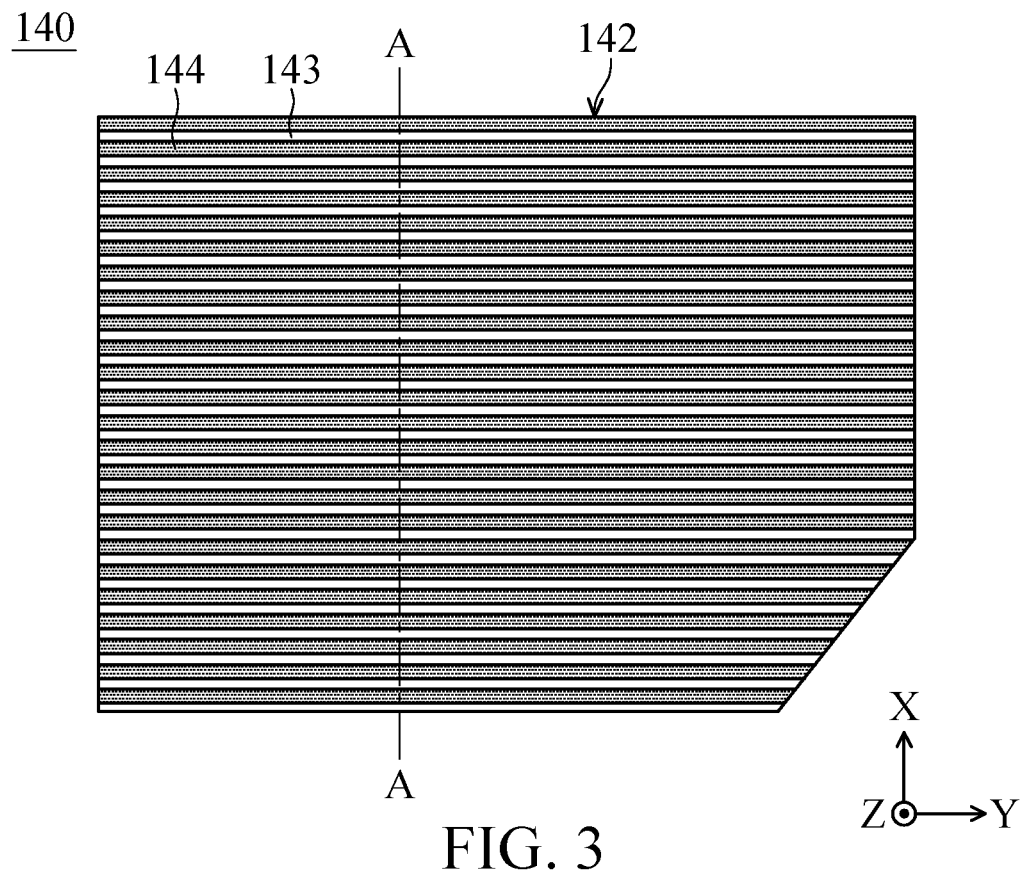
FIG. 3 is a bottom view illustrating a diffuser in accordance with some embodiments of the present disclosure.

FIG. 3 is a bottom view illustrating the diffuser 140 in accordance with some embodiments of the present disclosure. As shown in FIG. 3, the bottom surface 142 of the diffuser 140 may have a plurality of protrusions 144. In the present embodiments, the protrusions 144 may be arranged parallel to each other substantially. However, the present disclosure is not limited thereto.

Figure 4A:
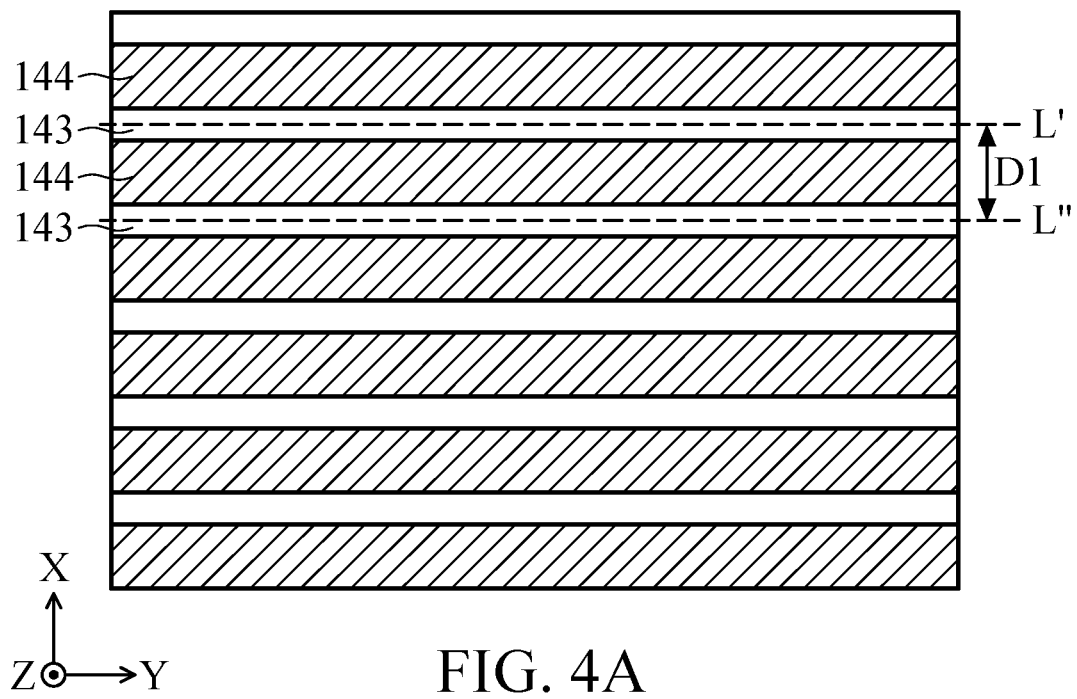
FIG. 4A is a partial enlarged view illustrating the diffuser in accordance with some embodiments of the present disclosure.

FIG. 4A is a partial enlarged view illustrating the diffuser 140 in accordance with some embodiments of the present disclosure. As shown in FIG. 4A, the bottom surface 142 may have a plurality of recesses 143 and a plurality of protrusions 144, wherein the recesses 143 and the protrusions 144 may be alternatively arranged. In some embodiments, the distance between two adjacent recesses 143 (or two adjacent protrusions 144) may be substantially consistent, but the present disclosure is not limited thereto.

A distance D1 may be defined as the shortest distance between the centerlines L' and L" of two adjacent recesses 143, and the distance D1 may range from about 250 μm to 310 μm (250 μm≤the distance D1≤310 μm), such as about 250 μm or 300 μm in the present embodiment. For example, the distance D1 may be measured along the X direction perpendicular to the extending direction of the protrusions 144, shown in FIG. 3, for example. However, the present disclosure is not limited thereto.

Figure 4B:
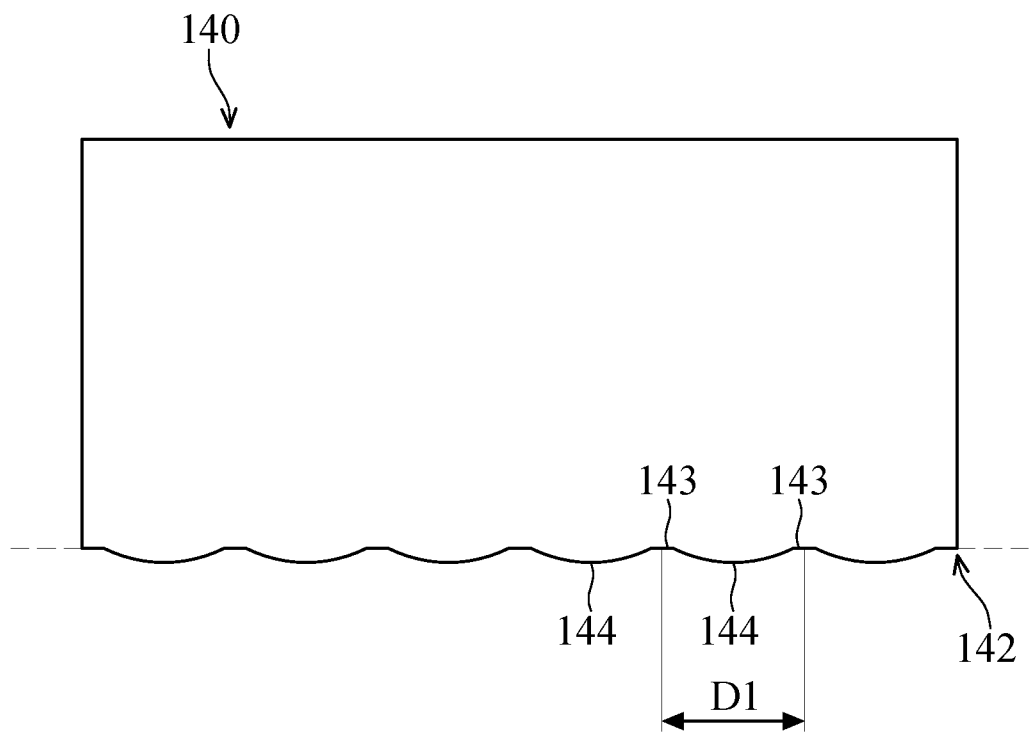
FIG. 4B is a cross-sectional view illustrating the diffuser in accordance with some embodiments of the present disclosure.

FIG. 4B is a cross-sectional view along the line A-A shown in FIG. 3 in accordance with some embodiments of the present disclosure. As shown in FIG. 4B, the protrusions 144 may be substantially curved. The detailed structure of the protrusions 144 will be discussed in accompany with FIG. 4C as follows. A curved shape of the protrusions 144 may be advantageous for scattering the light emitted by the light emitting units 110, but the present disclosure is not limited thereto.

Figure 4C:
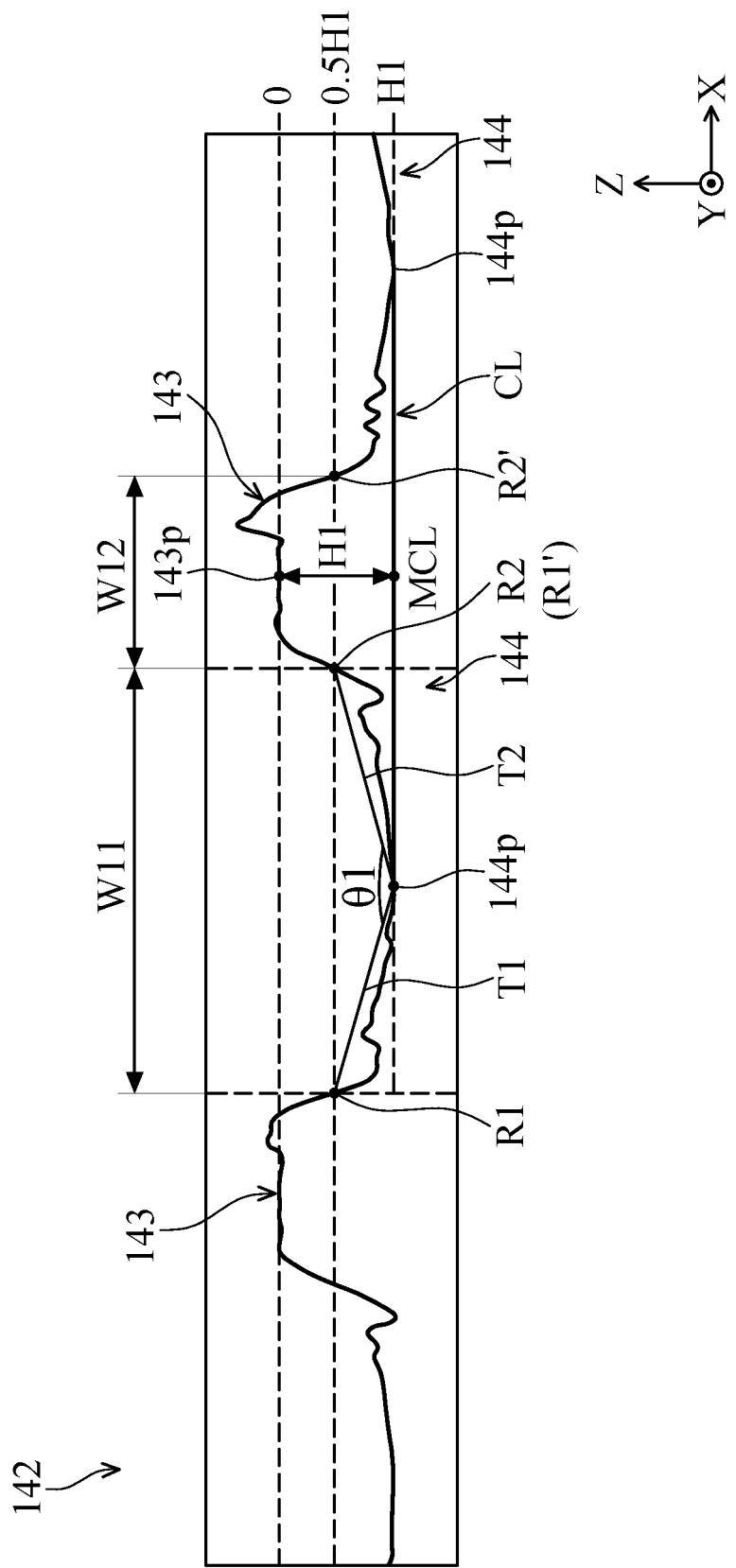
FIGS. 4C, 5, 6, and 7 are illustrative examples for profiles of a bottom surface of the diffuser in accordance with some embodiments of the present disclosure.

FIG. 4C illustrates the profile of the bottom surface 142 of the diffuser 140 in accordance with some embodiments of the present disclosure. It should be noted that the profile of the bottom surface 142 may be measured by a laser microscope, such as the VK-9700 3D Laser Scanning Microscope of KEYENCE, but the present disclosure is not limited thereto. In the present embodiment, the peak 144p of the protrusion 144 may be defined as the lowest point of the protrusion 144, for example. In this way, two peaks 144p of the two adjacent two protrusions 144 may be defined. Then, a connecting line CL between the two peaks 144p of two adjacent protrusions 144 may be illustrated. A trough 143p of the recess 143 may be defined as a point directly above a midpoint MCL of the connecting line CL between the two peaks 144p. In other words, the midpoint MCL of the connecting line CL between the two peaks 144p may be projected on the recess 143 and the projection of the midpoint MCL of the connecting line CL between the two peaks 144p may overlap the trough 143p.

A depth H1 may be defined as a shortest distance between the midpoint MCL of the connecting line CL and the trough 143p of the recess 143. For example, the depth H1 may be measured in the Z direction perpendicular to the connecting line CL between two protrusions 144. In some embodiments, the depth H1 may range from about 35 μm to 52 μm (35 μm≤the depth H1≤52 μm), such as about 42 μm or 47 μm. After that, a half-height 0.5H1 may be defined, and a horizontal line is illustrated at the half-height 0.5H1 along the X direction perpendicular to the extending direction of the protrusions 144, as shown in FIG. 3, for example. The two points that the horizontal line and one of the protrusions 144 intersect are defined as a point R1 and a point R2. Similarly, a horizontal line is illustrated at the half-height 0.5H1 along the X direction perpendicular to the extending direction of the recess 143, as shown in FIG. 3, for example. The two points that the horizontal line and the recess 143 intersect are defined as a point R1' and a point R2'. In some embodiments, the point R2 and the point R1' may overlap, but the present disclosure is not limited thereto. In some embodiments, the secant line T1 may be illustrated by connecting the peak 144p and the point R1, and the secant line T2 may be illustrated by connecting the peak 144p and the point R2. Accordingly, the convex angle θ1 between the secant line T1 and the secant line T2 may be obtained. In some embodiments, the convex angle θ1 may range from about 90° to 155° (90°≤the convex angle θ1≤155°), such as about 100°, 120°, 130°, 140° or 150°. However, the present disclosure is not limited thereto.

Furthermore, a width W11 of each of the protrusions 144 may be defined as a distance between the point R1 and the point R2 of the protrusion 144. A width W12 of each of the recesses 143 defined as a distance between the point R1' and the point R2' of the recesses 143. That is to say, the width W11 may be a full width at half maximum (FWHM) of the protrusion 144, and the width W12 may be a full width at half maximum (FWHM) of the recesses 143. For example, the width W11 and the width W12 are measured along the X direction parallel to the line connecting two adjacent protrusions 144. In some embodiments, the width W11 may range from about 180 μm to 220 μm (180 μm≤the width W11≤220 μm), such as 190 μm, 200 μm or 210 μm, such as about 205 μm in the present embodiment. The width W12 may range from about 96 μm to 110 μm (96 μm≤the width W12≤110 μm), such as about 100 μm or 105 μm. In some embodiments, the width W11 may be greater than the width W12, but not limited thereto. The above configuration may also be advantageous for scattering the light emitted by the light emitting units 110. However, the present disclosure is not limited thereto.

Figure 5:
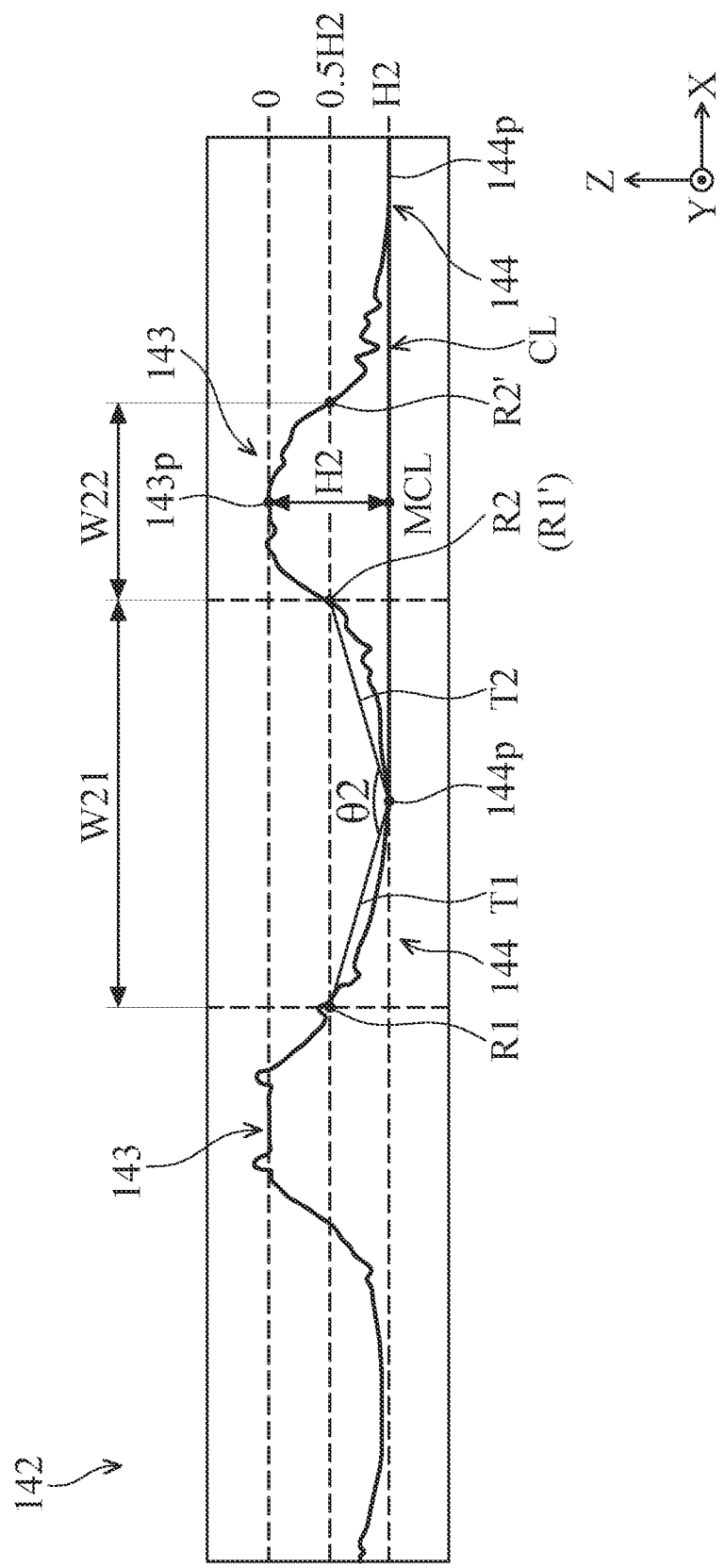
Figure 6:
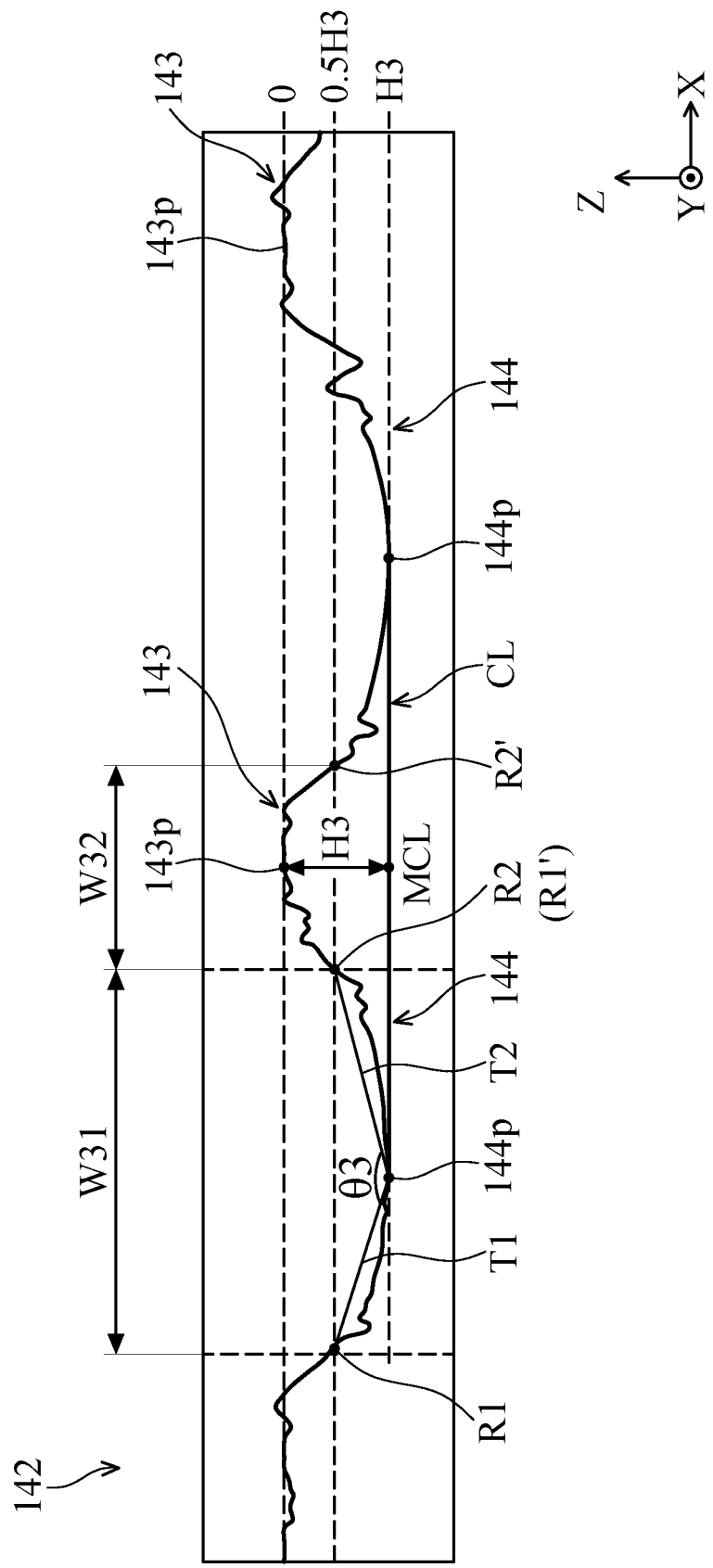
Figure 7:
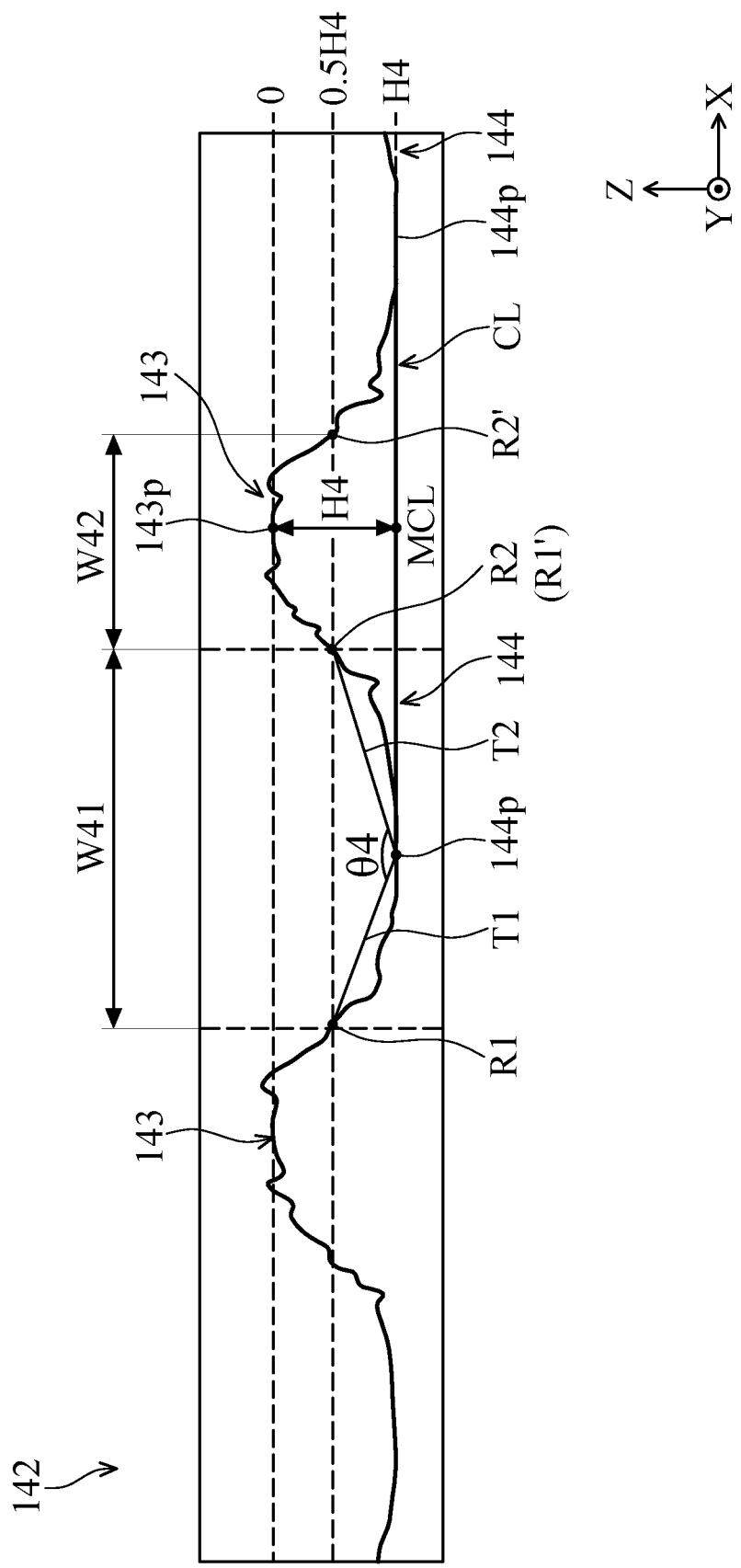

FIGS. 5-7 illustrates the profile of the bottom surface 142 of the diffuser 140 in accordance with some embodiments of the present disclosure. The measurement and the definitions are the same or similar to the diffuser 140 illustrated in FIG. 4C, and it will not repeated hereinafter. In FIG. 5, for example, the depth H2 may be measured in the Z direction perpendicular to the connecting line CL between two protrusions 144. In some embodiments, the depth H2 may range from about 35 μm to 52 μm (35 μm≤the depth H2≤52 μm), such as about 48 μm in the present embodiment. In some embodiments, the width W21 may range from about 180 μm to 220 μm (180 μm≤the width W21≤220 μm), such as about 200 μm in the present embodiment. The width W22 may range from about 96 μm to 110 μm (96 μm≤the width W22≤110 μm), such as about 100 μm in the present embodiment. In some embodiments, the width W21 may be greater than the width W22. However, the present disclosure is not limited thereto.

In FIG. 6, in some embodiments, the depth H3 may range from about 35 μm to 52 μm (35 μm≤the depth H3≤52 μm), such as about 40 μm in the present embodiment. After that, a half-height 0.5H3 may be defined. In some embodiments, the width W31 may range from about 180 μm to 220 μm (180 μm≤the width W31≤220 μm), such as about 188 μm in the present embodiment. The width W32 may range from about 96 μm to 110 μm (96 μm≤the width W32≤110 μm), such as about 98 μm in the present embodiment. In some embodiments, the width W31 may be greater than the width W32. However, the present disclosure is not limited thereto.

In FIG. 7, in some embodiments, the depth H4 may range from about 35 μm to 52 μm (35 μm≤the depth H4≤52 μm), such as about 44 μm in the present embodiment. For example, the width W41 and the width W42 may be measured in the X direction parallel to the connecting line CL between two protrusions 144. In some embodiments, the width W41 may range from about 180 μm to 220 μm (180 μm≤the width W41≤220 μm), such as about 186 μm in the present embodiment. The width W42 may range from about 96 μm to 110 μm (96 μm≤the width W42≤110 μm), such as about 100 μm in the present embodiment. In some embodiments, the width W41 may be greater than the width W42. However, the present disclosure is not limited thereto.

Figure 8:
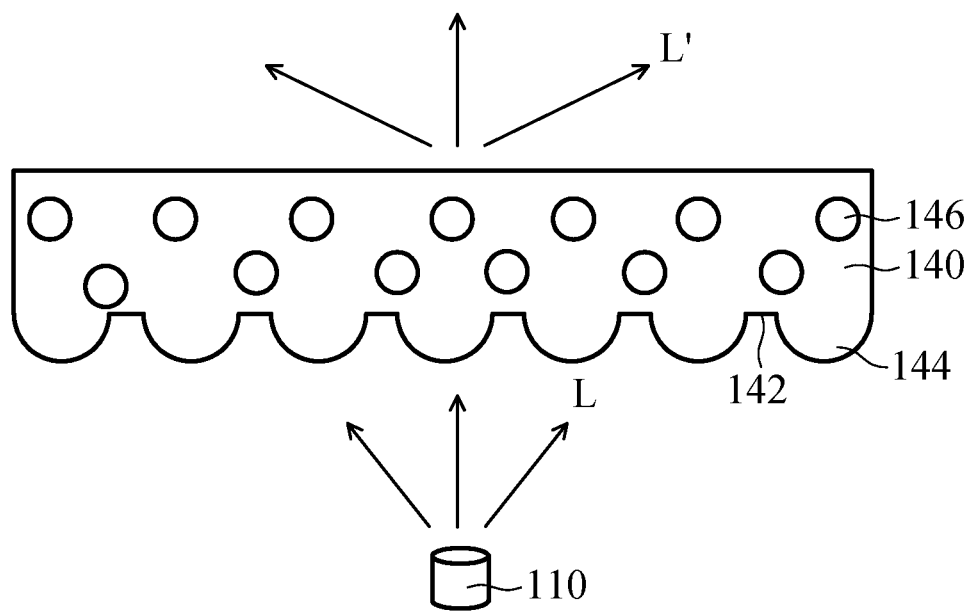
FIG. 8 is a cross-sectional view illustrating the diffuser in accordance with some embodiments of the present disclosure.

FIG. 8 is a cross-sectional view illustrating the diffuser 140 in accordance with some embodiments of the present disclosure. As shown in FIG. 8, the diffuser 140 may include a plurality of scattering particles 146, wherein the material of the scattering particles 146 may be different from the material of the diffuser 140. In some embodiments, the refraction index of the scattering particles 146 may be greater than the refraction index of the diffuser 140. The arrangement of the scattering particles 146 may enhance the uniformity of light distribution. As shown in FIG. 8, the light L' may be scattered more widely (compared to the light L emitted by the light emitting unit 110) after passing through the diffuser 140 with the scattering particles 146. It should be understood that the scattering particles 146 may also be located in the protrusions 144 (not shown in FIG. 8).

Figure 9:
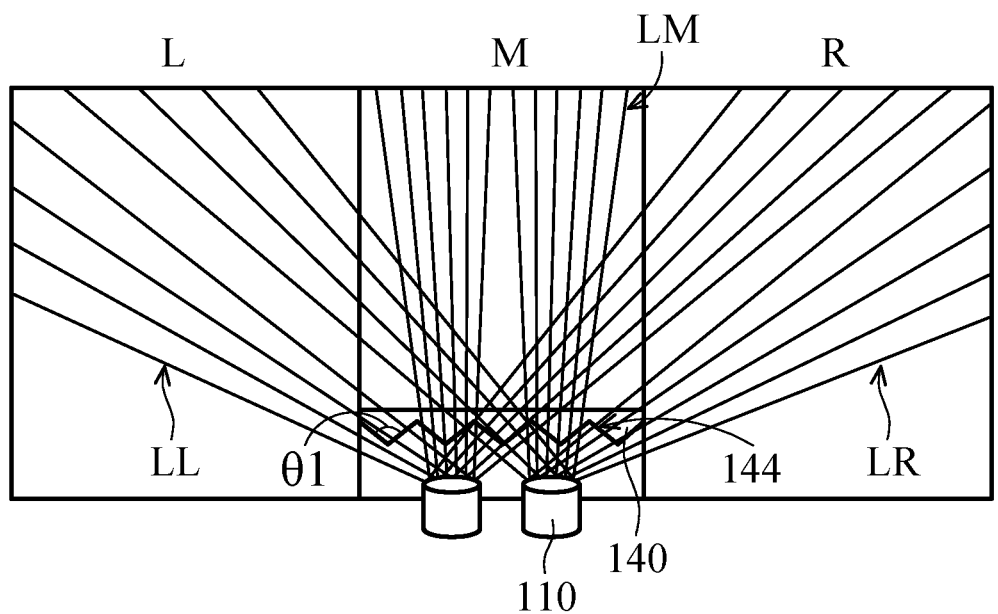
FIG. 9 illustrates the result of simulation when the convex angle θ1 is 120° as an exemplary illustration in accordance with some embodiments of the present disclosure.

FIG. 9 illustrates the result of simulation when the convex angle θ1 is 120° as an exemplary illustration in accordance with some embodiments of the present disclosure. As shown in FIG. 9, the diffuser 140 may be disposed on the light emitting units 110 and may have a plurality of protrusions 144 facing the light emitting units 110. The light emitting units 110 may emit the light passing through the diffuser 140. In some embodiments, a central region M may be located on the top surface of the diffuser 140 and the projection of the central region M in X direction may overlap the diffuser 140. In addition, a left region L and a right region R may be located at two opposite sides of the central region M respectively. In other words, the central region M may be located between the left region L and the right region R.

It is noted that the distribution of the emitted light may be counted as the ratio of the lights propagating to each of the central region M, the left region L and the right region R. For example, the ratio of the lights passing through the left imaginary line LL to the total lights emitted from the light emitting units 110 is 0.27. The ratio of the lights passing through the right imaginary line LR to the total lights emitted from the light emitting units 110 is 0.33. The ratio of the lights passing through the center imaginary line LM to the total lights emitted from the light emitting units 110 is 0.40. Therefore, about 60% of the total lights may be scattered by the diffuser 140 to increase the uniformity of the overall light intensity of the backlight module 10. In this embodiment, under the condition that the ratio of the optical distance OD to the pitch P of two adjacent light emitting units 100 may be equal to 0.6, the results of simulating the distribution of the emitted lights corresponding to different convex angles θ1 of the protrusions 144 are shown in Table 1.

TABLE 1

| Convex angle θ1 (degree) | Proportion of emitted light in left region | Proportion of emitted light in right region | Total |
| --- | --- | --- | --- |
| 30 | 0.18 | 0.18 | 0.36 |
| 60 | 0.20 | 0.30 | 0.50 |
| 90 | 0.43 | 0.29 | 0.71 |
| 120 | 0.27 | 0.33 | 0.60 |
| 130 | 0.41 | 0.35 | 0.76 |
| 150 | 0.33 | 0.33 | 0.66 |
| 160 | 0.29 | 0.29 | 0.38 |

As set forth above, the embodiments of the present disclosure may provide a backlight module and a display device including a diffuser and the diffuser including a bottom surface having a plurality of protrusions. Since the diffuser has a bottom surface with a plurality of protrusions facing the light emitting units, the distribution of the emitted light may be more uniform, and therefore the possibility that mura (such as hotspot issue) occurs in the display device may be reduced. In other ways, the emitted light may be softer with the above configuration, or the overall size of the backlight module is reduced. In addition, these protrusions may be substantially curved, and the emitted light may be scattered more widely.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A light emitting device, comprising:
   a light bar comprising a plurality of light emitting units emitting light and a circuit board, wherein the plurality of light emitting units are disposed on the circuit board;
   a film, which the light passes through, disposed on the plurality of light emitting units, wherein the film comprises a plurality of protrusions; and
   a supporting portion supporting the film, wherein the supporting portion is higher than the plurality of light emitting units;
   wherein in a top view of the light emitting device, the supporting portion and the plurality of protrusions of the film are overlapped;
   wherein an extending direction of a lengthwise side of the light bar is parallel to an extending direction of the plurality of protrusions;
   wherein a pitch between two adjacent ones of the plurality of light emitting units is greater than an optical distance between the film and the circuit board.

2. The light emitting device as claimed in claim 1, wherein in the top view of the light emitting device, the plurality of protrusions extend along a direction parallel to an edge of the film.

3. The light emitting device as claimed in claim 1, further comprising a housing disposed over the plurality of light emitting units and overlapped with the plurality of protrusions.

4. The light emitting device as claimed in claim 3, further comprising a display panel, wherein the display panel is spaced apart from the film by the housing.

5. The light emitting device as claimed in claim 3, further comprising a frame covering the housing, wherein in the top view of the light emitting device, the frame and the plurality of protrusions are overlapped.

6. The light emitting device as claimed in claim 1, further comprising a reflection layer, wherein the reflection layer comprises a plurality of openings exposing the plurality of light emitting units.

7. The light emitting device as claimed in claim 1, further comprising another film, which the light passes through, overlapping the film.

8. The light emitting device as claimed in claim 7, wherein the another film comprises a color conversion film.

9. The light emitting device as claimed in claim 1, wherein the plurality of protrusions are substantially curved.

10. The light emitting device as claimed in claim 1, wherein the plurality of protrusions are spaced at a constant interval.

11. The light emitting device as claimed in claim 1, wherein the supporting portion is in contact with the plurality of protrusions.

\* \* \* \* \*